United States Patent
Kitagawa (10) Patent No.: US 8,606,018 B2
(45) Date of Patent: Dec. 10, 2013

(54) IMAGE PROCESSING METHOD AND IMAGE PROCESSING APPARATUS

(75) Inventor: Kan Kitagawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 994 days.

(21) Appl. No.: 12/484,360

(22) Filed: Jun. 15, 2009

(65) Prior Publication Data

US 2009/0310881 A1 Dec. 17, 2009

(30) Foreign Application Priority Data

Jun. 17, 2008 (JP) .................. 2008-158322

(51) Int. Cl.
- G06K 9/20 (2006.01)
- G06K 9/36 (2006.01)
- G06K 9/34 (2006.01)
- G06K 9/00 (2006.01)
- G06K 9/62 (2006.01)
- H04N 1/40 (2006.01)

(52) U.S. Cl.
USPC ........... 382/209; 382/282; 382/286; 382/173; 382/181; 358/449

(58) Field of Classification Search
USPC ....................................... 382/266
See application file for complete search history.

(56) References Cited

U.S. PATENT DOCUMENTS

| | | | |
|---|---|---|---|
| 4,559,644 A * | 12/1985 | Kataoka et al. ............... | 382/254 |
| 5,109,431 A * | 4/1992 | Nishiya et al. ................ | 382/209 |
| 5,481,375 A | 1/1996 | Eto et al. ....................... | 358/450 |
| 5,960,448 A * | 9/1999 | Reichek et al. ............... | 715/236 |
| 6,268,935 B1 | 7/2001 | Kingetsu et al. .............. | 358/433 |
| 6,571,022 B2 * | 5/2003 | Okisu et al. ................... | 382/294 |
| 6,690,486 B1 * | 2/2004 | Ogoh et al. .................... | 358/1.9 |
| 6,738,160 B1 * | 5/2004 | Kato et al. ..................... | 358/1.9 |
| 6,980,329 B2 * | 12/2005 | Koga ............................. | 358/2.1 |
| 2003/0174907 A1 * | 9/2003 | Kanemoto et al. ............ | 382/309 |
| 2004/0170324 A1 | 9/2004 | Eguchi et al. ................. | 382/199 |
| 2005/0013486 A1 * | 1/2005 | Wiedemann et al. ......... | 382/181 |
| 2005/0268707 A1 * | 12/2005 | Dale et al. ....................... | 73/146 |
| 2006/0072818 A1 * | 4/2006 | Herley ........................... | 382/173 |
| 2006/0289086 A1 * | 12/2006 | Rinfret et al. .................. | 144/357 |
| 2008/0175469 A1 | 7/2008 | Toyoda et al. ................ | 382/149 |
| 2008/0221767 A1 * | 9/2008 | Ikeda et al. ..................... | 701/70 |

FOREIGN PATENT DOCUMENTS

JP  3-64261  3/1991

(Continued)

OTHER PUBLICATIONS

English language abstract for JP 402264374 A.*

(Continued)

*Primary Examiner* — Michelle Entezari (74) *Attorney, Agent, or Firm* — Fitzpatrick, Cella, Harper & Scinto (57) ABSTRACT

An image processing method includes the steps of: reading an original placed on an original platen; executing a filtering process to extract a contour on the read image; extracting a contour group in broken lines from the image having the filtering process executed; forming one contour from the contour group in broken lines; determining an area of the original from the contours obtained in the filtering execution step and the forming step; and extracting an image of the determined original area from the read image.

10 Claims, 6 Drawing Sheets

(56) References Cited

FOREIGN PATENT DOCUMENTS

| | | |
|---|---|---|
| JP | 6-178086 | 6/1994 |
| JP | 8-202876 | 8/1996 |
| JP | 10-293845 | 11/1998 |
| JP | 2000-283725 | 10/2000 |
| JP | 2004-096435 | 3/2004 |
| JP | 2004-201240 | 7/2004 |
| JP | 2008-47664 | 2/2008 |

OTHER PUBLICATIONS

Machine translation for IDS document JP 6178086 (also referenced as JP 3083671).*
Machine translation for IDS document JP 200496435 A.*
Chinese Office Action dated Dec. 1, 2010 from corresponding Chinese Application No. 200910147263.4, and English language translation thereof.

* cited by examiner

CONTOUR EXTRACTION ⇒

FIG. 4C

⇙ CONTOUR COMBINATION

FIG. 4D

ORIGINAL AREA ESTIMATION ⇒

IMAGE PROCESSING METHOD AND IMAGE PROCESSING APPARATUS

BACKGROUND OF THE INVENTION

1. Field of the Invention

The present invention relates to an image processing apparatus that reads an original placed on an original platen (or document table) of an image reading apparatus, processes an image of the read original, and cuts out and outputs only an original area placed on the platen.

2. Description of the Related Art

To read an original placed on an original platen and cut out an original area from the read image, a known technique extracts a contour surrounding the original and cuts out a rectangular part surrounded by the contour as the original area. The contour of the read image is first extracted to cut out the read original area. As an extraction method there is well-known a method of using an image processing filter often used in general image processing to search a significant change in color or luminance of a target pixel compared to surrounding pixels. In this method, a certain threshold is set to a result value obtained by using an image processing filter to easily extract the contour, and the extracted contour is used to cut out the original area of the read image.

Japanese Patent Application Laid-Open No. 2004-201240 discloses an invention for detecting RGB array patterns of the entire original platen surface and detecting a border between the backside of a scanner cover, which presses the original, and the original area, i.e. a contour of the original, based on the difference in gradations.

Japanese Patent Application Laid-Open No. H06-178086 discloses an invention for specifying connections by making a collation of the original torn and separated into a plurality of pieces of paper based on the shapes of cut sides and features of images of the cut sides to detect nonlinear cut sides.

However, the following problems exist in the method of extracting the contour of the read image when the contour of the original is nonlinear, especially when the cut sides of the original are finely cut into sawtooth shapes. More specifically, shades are formed on the nonlinear cut sides due to irregular reflection by the light of the light source illuminating the original and the reflected light of a pressure plate pressing the original. The shades are extracted as an intermittent, regular contour. Therefore, a straightly continuous contour cannot be extracted, and the contour of the original cannot be extracted. Thus, there is a problem that the original with nonlinear contour of original cannot be appropriately cut out to read the image. In the method of collating the broken lines of the torn original, there is also a problem that the features are falsely detected when the cut sides are in a finely sawtooth shape because shades are formed by the irregular reflection.

An object of the present invention is to provide an image processing apparatus that can appropriately cut out and read an original area of an original even if there are shades on nonlinear cut sides, caused by the leakage of light caused by irregular reflection of light by the light source illuminating the original and the reflected light of a pressure plate pressing the original.

SUMMARY OF THE INVENTION

The present invention provides an image processing method including: a step of reading an original placed on an original platen; a step of executing a filtering process to extract a contour on the read image; a step of extracting a contour group in broken lines from the image having the filtering process executed; a step of forming one contour from the contour group in broken lines; a step of determining an area of the original from the contours obtained in the filtering execution step and the forming step; and a step of extracting an image of the determined original area from the read image.

Further features of the present invention will become apparent from the following description of exemplary embodiments with reference to the attached drawings.

DESCRIPTION OF THE EMBODIMENTS

Figure 1:
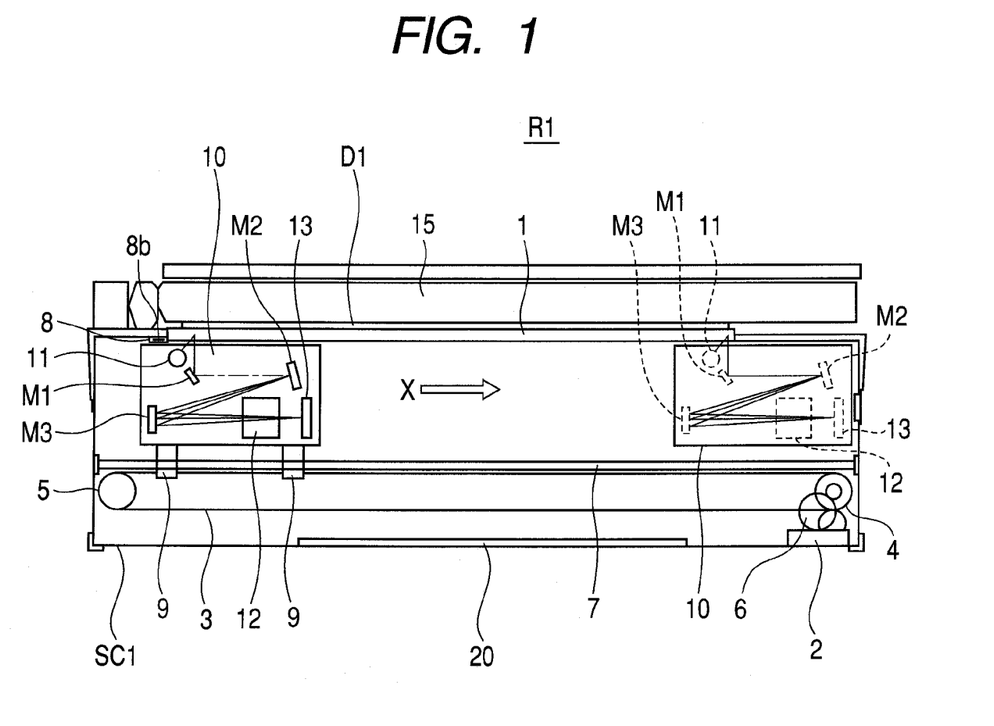
FIG. 1 is a cross-sectional view of an image reading apparatus R1 used in the description of the present invention.

FIG. 1 is a cross-sectional view of an image reading apparatus R1 applying embodiments of the present invention. The image reading apparatus R1 includes a scanner SC1 and an original pressing plate 15. The scanner SC1 is connected to a host computer through an interface cable not shown. The scanner SC1 includes an optical unit 10, a platen glass 1, an electric board 20, a pulse motor 2, an endless belt 3, pulleys 4 and 5, a gear array 6, a guide rail 7, and a white reference plate 8. The white reference plate 8 includes a black mark 8b, and the scanner SC1 determines a reading area and reads an image based on the black mark 8b. The optical unit 10 and the pulse motor 2 are electrically connected through a cable not shown. The optical unit 10 is slidably mounted on the guide rail 7 through a mounting unit 9. The mounting unit 9 is fixed on the endless belt 3. The optical unit 10 includes a light source 11, a plurality of reflection mirrors M1, M2, and M3, an imaging lens 12, and a line sensor 13 as an imaging means.

An operation of the scanner SC1 reading a reflected original image will now be described. The scanner SC1 starts the reading operation based on a reading command from the host computer. The scanner SC1 lights up the light source 11 of the optical unit 10, reflects the reflected light from the original on the mirrors M1, M2, and M3, and forms an image on the line sensor 13 through the imaging lens 12 to read one line of image in the main scanning direction. The pulse motor 2 rotates the pulley 4 through the gear array 6 to drive the endless belt 3. Consequently, the optical unit 10 fixed on the mounting unit 9 moves over the guide rail 7 in the sub scanning direction illustrated with an arrow X through the endless belt 3.

The scanner SC1 repeats reading the line images in the main scanning direction while moving the optical unit 10 in the sub scanning direction. The scanner SC1 moves the optical unit 10 to the location illustrated with a dotted line in FIG. 1 while executing the reading operation to scan the entire surface of the platen glass 1. The scanner SC1 can read a partial image of the original on the platen glass 1 depending on the content of the reading command from the host computer. This is realized by a control unit on an electric board described below defining the pixel range to be adopted from the sensor output in the main scanning direction of the reading image range designated by the host computer and defining the moving range of the optical unit in the sub scanning direction. The pulse motor 2 rotates the pulley 4 through the gear array 6 to drive the endless belt 3. As a result, the optical unit 10 fixed on the mounting unit 9 moves over the guide rail in the sub scanning direction illustrated with the arrow X through the endless belt 3.

It is realized by a control unit on an electric board 20 described below defining the pixel range to be adopted from the sensor output in the main scanning direction of the reading image range designated by the host computer and defining the moving range of the optical unit in the sub scanning direction. When the optical unit 10 is moved in the sub scanning direction, the host computer sets the resolution of the designated image reading, and the system controller 21 selects the speed to read the image.

Figure 2:
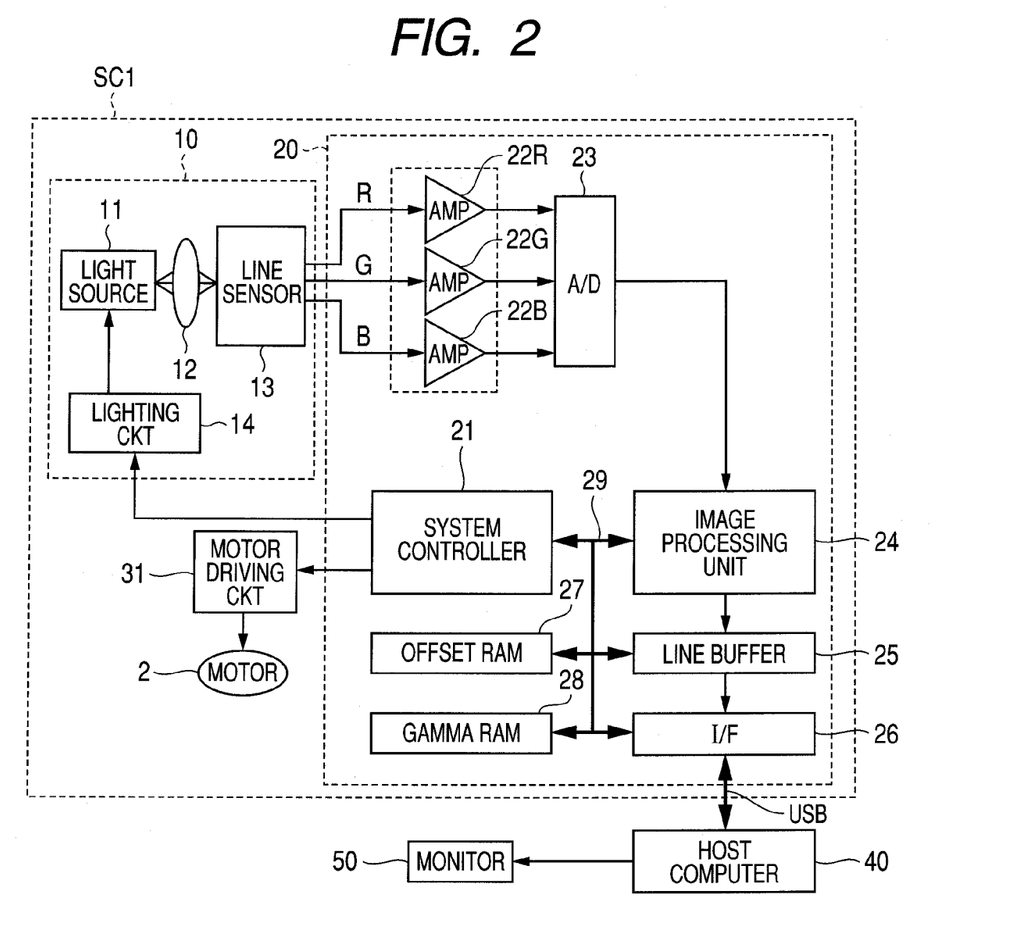
FIG. 2 is a block diagram mainly illustrating a functional configuration of a scanner SC1.

FIG. 2 is a block diagram mainly illustrating a functional configuration of the scanner SC1, and the same configurations as in FIG. 1 are designated with the same reference numerals.

In the optical unit 10, a light source lighting circuit 14 controls lighting of the light source 11. On the electric board 20, analog gain adjusters 22R, 22G, and 22B change and amplify an analog image signal output from the line sensor 13. An A/D converter 23 converts an analog image signal output from the analog gain adjusters 22R, 22G, and 22B to a digital image signal. An image processing unit 24 applies image processing, such as offset correction, shading correction, digital gain adjustment, color balance adjustment, masking, resolution conversion in the main and sub scanning directions, and image compression, to the digitalized image signal.

A line buffer 25 is a portion that temporarily stores image data and includes a universal random access memory. An I/F 26 communicates with a host computer 40. In this case, the I/F 26 is realized by a USB interface. An offset RAM 27 is used as a working area of image processing. RGB line sensors with predetermined offsets are arranged in parallel in the line sensor 13, and the offset RAM 27 is used to correct the offsets between the RGB lines. The offset RAM 27 also temporarily stores various data such as shading correction. A gamma RAM 28 is a RAM for storing gamma curves and executing gamma correction.

A system controller 21 stores a sequence of the entire film scanner and performs various controls according to commands from the host computer 40. A CPU bus 29 interconnects the system controller 21, the image processing unit 24, the line buffer 25, the I/F 26, the offset RAM 27, and the gamma RAM 28, and includes an address bus and a data bus. A motor driving circuit 31 outputs an excitation switching signal of the pulse motor 2 based on a signal from the system controller 21 as a system control unit of the scanner SC1.

Figure 3:
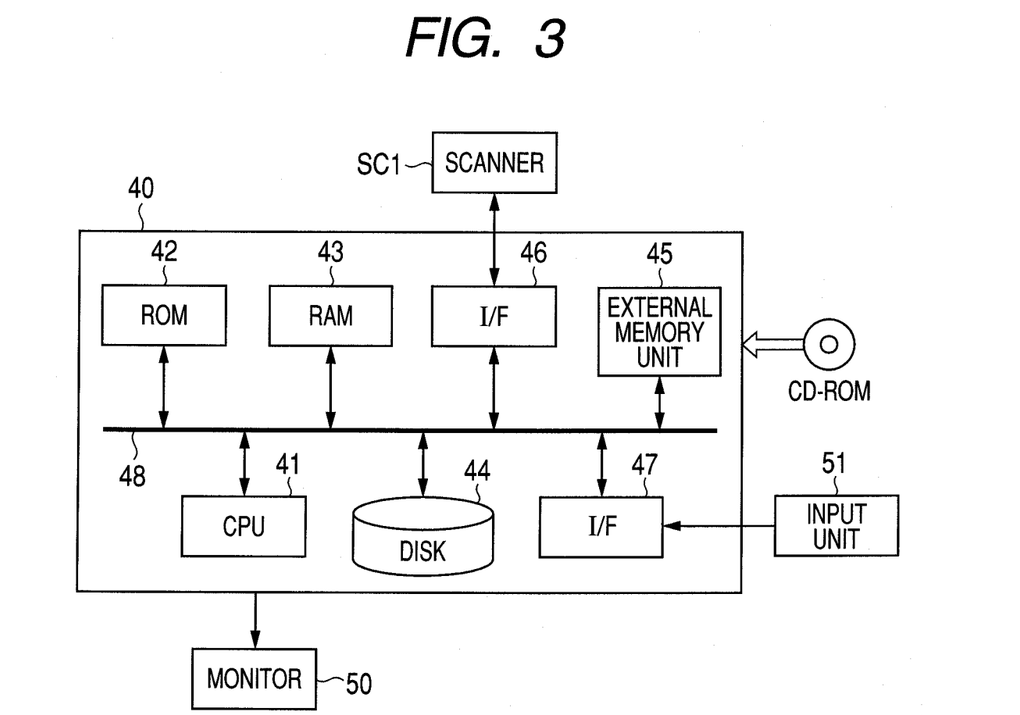
FIG. 3 is a block diagram of a configuration of a host computer of the scanner SC1.

FIG. 3 is a block diagram of a configuration of a general computer used as a host computer of the scanner SC1. The host computer 40 includes a ROM 42, a RAM 43, a CPU 41, a disk device 44, a bus 48, an I/F 46, an I/F 47, and an external memory unit 45. The ROM 42 holds a program for realizing a control procedure illustrated in FIG. 5 described below. The RAM 43 provides a storage area and a work area necessary for the operation of the program. The CPU 41 executes a process according to the program held in the ROM 42. The bus 48 connects the configurations and allows transmission and reception of data between the configurations. The I/F 46 communicates with the scanner SC1 and is a USB interface as is the I/F 26 of the scanner SC1. The I/F 47 connects with an input unit 51 such as a mouse and a keyboard. The external memory unit 45 drives an external storage medium, such as a Floppy (registered trademark) disk and a CD-ROM, and reads and downloads a control program when the control program is stored in the external storage medium instead of being stored in the ROM 42. Although not illustrated, the control program may be downloaded from a network through a network connector.

First Embodiment

Figure 4A:
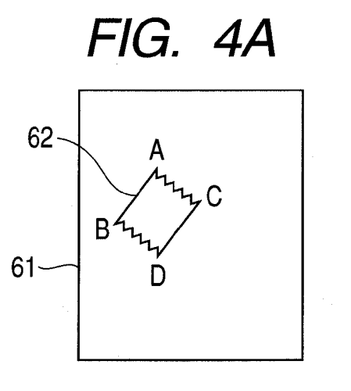
FIG. 4A is a diagram of an example of placing an original on an original platen.
Figure 4B:
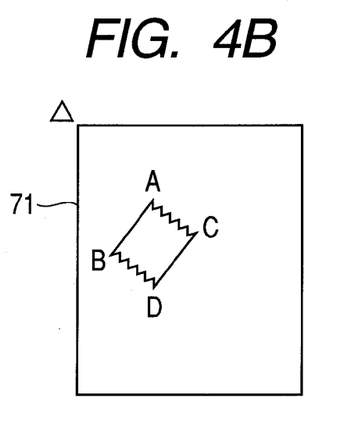
FIGS. 4B, 4C, 4D and 4E are diagrams for describing a process of an image read from the platen of FIG. 4A.
Figure 4C:
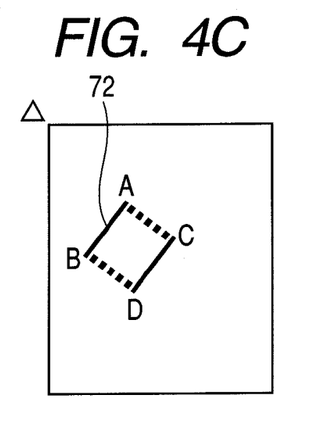
Figure 4D:
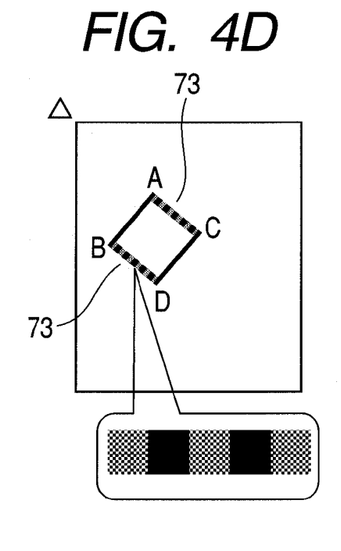
Figure 4E:
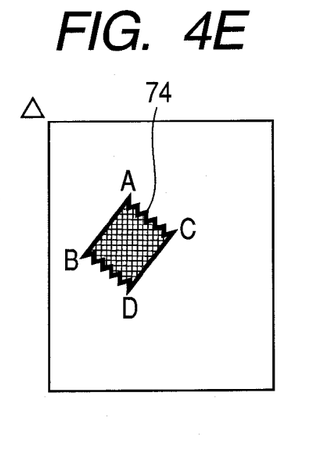

An operation of a first embodiment will now be described. FIG. 4A is a diagram of an example of placing an original on an original platen according to the first embodiment. FIGS. 4B to 4E are explanatory views of a process for estimating an original area from an image read in FIG. 4A.

As illustrated in FIG. 4A, an original D1 having nonlinear cut sides (sawtooth shape with about 1 mm pitch) is placed on an original platen 61 and covered by the original pressing plate 15 with white pressing surface. An example of the original D1 includes a roll of paper cut with a sawtooth-shaped blade. Two sides of the cut sides are in a sawtooth shape and other two sides in parallel are straight lines. When an image in 75 dpi resolution is read in the state of FIG. 4A, a read image 71 of FIG. 4B can be obtained. Since the light is obliquely illuminated as illustrated by the light source 11 of FIG. 1, there is shade at the edge of the original. The density of the shade is not uniform as the sawtooth shaped edges are not uniform.

Figure 5:
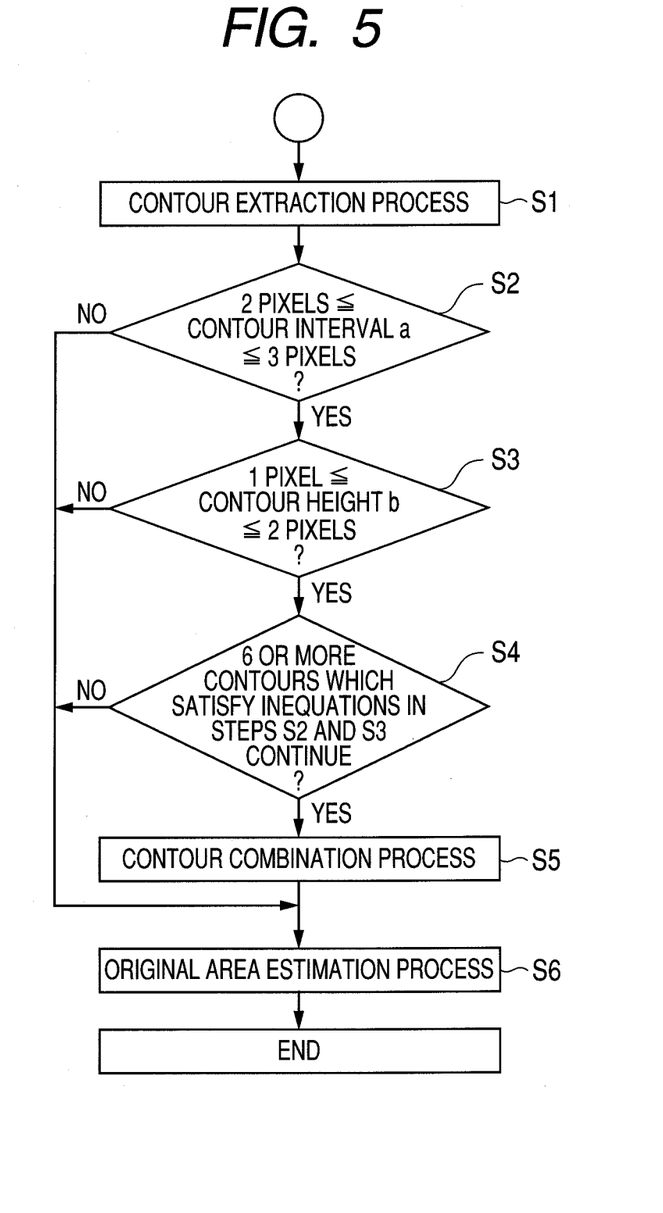
FIG. 5 is a flow chart of an operation of an embodiment.

FIG. 5 is a flow chart of an operation of the first embodiment. In S1, the image processing filter executes a contour extraction process. For example, the extraction of a contour is executed by a binarization process using an eight-directional Laplacian filter and. The eight-directional Laplacian filter multiplies a target point by −8 and other pixels by 1 in nine pixels on the left, right, top, and bottom around the target point and adds the result. If the total is greater than a binarizing threshold, the pixels are extracted as a contour. When the image processing filter executes the contour extraction process in S1 to the read image 71 of FIG. 4B, a contour AB connecting a point A and a point B and a contour CD connecting a point C and a point D are obtained in the original 62 placed on the platen 61, the original having peak points ABCD. The density of shade is not uniform on the cut side connecting the point A and the point C and the cut side connecting the point B and the point D. Therefore, a fragmentary, regular contour group in broken lines is obtained.

Figure 6A:
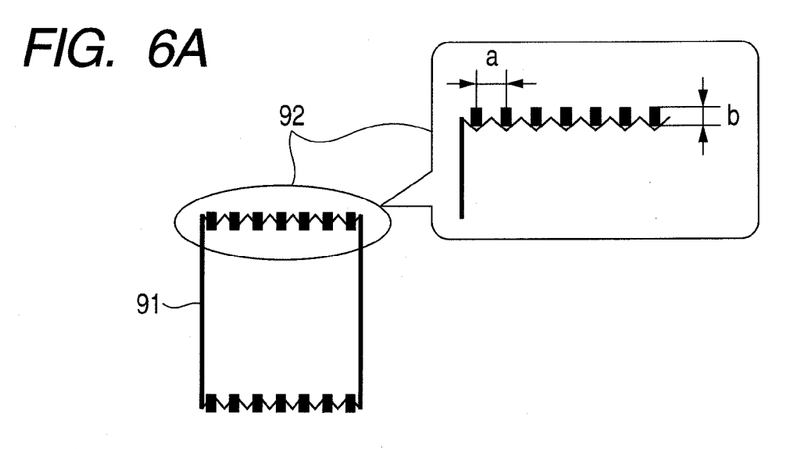
FIG. 6A illustrates an example of a filter processing result of a nonlinear cut side.
Figure 6B:
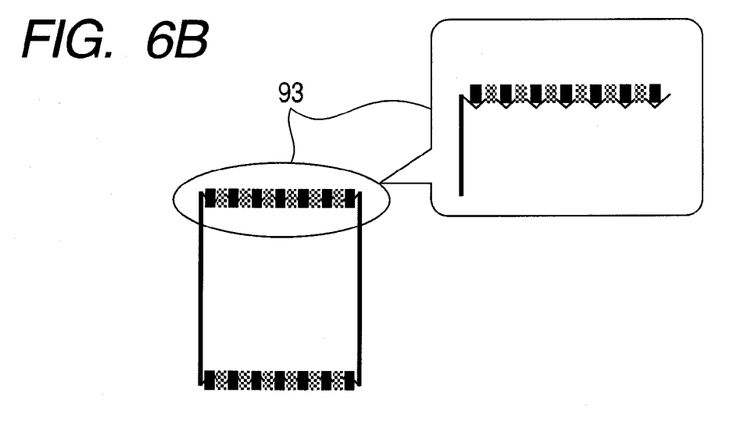
FIGS. 6B and 6C illustrate an example of further processing.
Figure 6C:
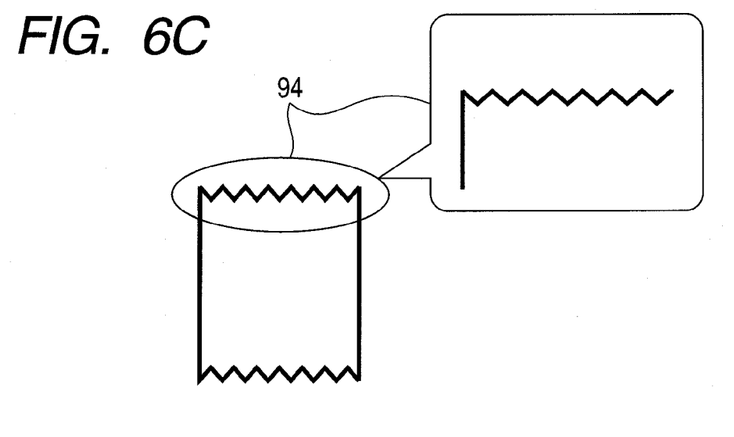

In S2, S3, and S4, a fragmentary, regular-shaped contour group in broken lines is detected, which is observed as features of the original 72 with nonlinear cut sides. FIGS. 6A to 6C illustrate details of the contour group. A contour group, in which the pitch of contour (a in FIG. 6A) is within 2 pixels to 3 pixels and the size of contour (b in FIG. 6A) is within 1 pixel to 2 pixels, is extracted from all contours obtained in S1. If six or more contours satisfying the conditions continue, a side 92 (FIG. 6A), in which the contour group continues, is determined to have regularity specific to the nonlinear cut side.

A contour combination process is executed in S5. The arrangement of two pixel dots between the contours of the contour group on the side 92 determined to have nonlinear cut sides in S2, S3, and S4 allows to obtain a side 93 (FIG. 6B) in which a contour group is artificially linearly combined.

If the pitch of the sawteeth is 1 mm, about three pixels form one pitch of the sawteeth, and about two pixels form the height of the sawteeth after reading at 75 dpi resolution. The pitch of the contour group in broken lines and the size of the contours are not greater than the sawtooth shape of the assumed original. The size of the contour group is not greater than the envisaged original. These values are examples, and the user's designation can make the processed values variable depending on the original and the reading resolution.

The original area is estimated in S6, and a smallest rectangle 74 included in a contour group 73 obtained in S2, S3, and S4 is generated. The rectangle 74 is determined to be the original area.

Second Embodiment

In a second embodiment of the present invention, when the cut side is determined to be nonlinear in S2, S3, and S4 in the contour combination process in S5 of the first embodiment, a continuous and adjacent contour group is detected on the cut side, and the start coordinate and the end coordinate are detected. According to the second embodiment, connecting the start coordinate and the end coordinate allows to obtain a contour close to the contour group and cut out the original area.

Third Embodiment

In a third embodiment of the present invention, when the cut side is determined to be nonlinear in S2, S3, and S4 in the contour combination process in S5 of the first embodiment, a side 94 in a pattern recorded in advance replaces the contour of the cut side as shown in FIG. 6C. The replacing shape is determined to be the contour, and the original area is cut out based on the replacing shape.

The first, second, and third embodiments can be applied to a system including a plurality of devices (for example, a host computer, an interface device, a scanner, a printer, and a complex machine).

To detect that the contour of the image is nonlinear, contours within a certain size among the contours of the read image are targeted, and based on the distances between the contours satisfying the condition and the number of continuous and adjacent contours, the fact that the contour of the image is nonlinear is detected. To perform an interpolation to make the contours linear, for example, two-pixel sized contours are interpolated between the adjacent contours of the contour group satisfying the conditions.

A storage medium (or recording medium) recording a program code of software realizing the functions of the embodiments may be supplied to a system or an apparatus. A computer (or CPU or MPU) of the system or the apparatus may read and execute the program code stored in the storage medium.

The program code read by the computer is executed to realize the functions of the embodiments. Additionally, an operating system (OS) operating on the computer executes part or all of the actual processes based on an instruction of the program code, and the processes realize the functions of the embodiments.

In the embodiments, the reference location of reading is a location that the image reading apparatus starts reading the image. A tilt correction may be applied to the result of the original area cutting process. Examples of the method for detecting the contour include a Laplacian filter, a Sobel filter, a Roberts filter, and a Prewitt filter.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Laid-Open No. 2008-158322, filed Jun. 17, 2008, which is hereby incorporated by reference herein in its entirety.

What is claimed is:

1. An image processing method comprising:
acquiring a read image obtaining by a reading of an original;
extracting broken lines from the read image of the original, wherein the broken lines are extracted from an image of an irregular cut side in the read image of the original;
determining whether the extracted broken lines have a predetermined repetitive pattern for determining a contour of the original; and
in a case where the broken lines have the predetermined repetitive pattern, specifying an area corresponding to the original from the read image based on the broken lines.

2. The image processing method according to claim 1, wherein the determining determines whether the extracted broken lines have the predetermined repetitive patterns for determining a sawtooth shaped contour.

3. The image processing method according to claim 1, further comprising forming an image corresponding to the specified area by interpolating the broken lines.

4. The image processing method according to claim 3, wherein in the forming of an image, one contour corresponding to the broken lines is formed by replacement with one straight line.

5. The image processing method according to claim 3, wherein in the forming of an image, one contour corresponding to the broken lines is formed by replacement with a preset pattern.

6. The image processing method according to claim 1, wherein the determining determines whether the extracted broken lines have a predetermined repetitive pattern based on at least one of a size of the broken lines, an interval between adjacent broken lines, and a number of the broken lines.

7. An image processing apparatus connected to an image reading apparatus, the image processing apparatus comprising:
a control unit that controls the image reading apparatus to read an image of an original;
an extraction unit that extracts broken lines from the read image of the original, wherein the broken lines are extracted from an image of an irregular cut side in the read image of the original;
a determination unit that determines whether the extracted broken lines have a predetermined repetitive pattern for determining a contour of the original; and
a specifying unit responsive to a determination that the broken lines have the predetermined repetitive pattern, the specifying unit being configured to specify an area corresponding to the original from the read image based on the broken lines.

8. A non-transitory computer-readable recording medium recording an execution program of the steps of claim 1 and readable by an image processing apparatus to execute an image processing method in the image processing apparatus.

9. The image processing method according to claim 1, wherein the determining determines whether the extracted broken lines have a predetermined repetitive pattern based on a pattern having a predetermined pitch corresponding to the cut side.

10. The image processing method according to claim 1, wherein the broken lines are extracted from non-linear contours in the read image of the original.

\* \* \* \* \*